(12) United States Patent
Fischer

(10) Patent No.: US 7,549,314 B2
(45) Date of Patent: Jun. 23, 2009

(54) CALIBRATING DEVICE FOR ADAPTING A MEASURING DEVICE FOR MEASURING THE THICKNESS OF THIN LAYERS ON AN OBJECT TO BE MEASURED

(75) Inventor: Helmut Fischer, Oberägeri (DE)

(73) Assignee: Immobiliengesellschaft Helmut Fischer GmbH & Co. KG, Sindelfingen (DE)

( * ) Notice: Subject to any disclaimer, the term of this patent is extended or adjusted under 35 U.S.C. 154(b) by 184 days.

(21) Appl. No.: 11/629,018

(22) PCT Filed: Jun. 6, 2005

(86) PCT No.: PCT/EP2005/006037

§ 371 (c)(1),
(2), (4) Date: Dec. 7, 2006

(87) PCT Pub. No.: WO2005/121695

PCT Pub. Date: Dec. 22, 2005

(65) Prior Publication Data

US 2008/0011041 A1    Jan. 17, 2008

(30) Foreign Application Priority Data

Jun. 7, 2004    (DE) .................. 20 2004 008 995 U

(51) Int. Cl.
*G01B 3/30*    (2006.01)

(52) U.S. Cl. ...................................................... 73/1.81
(58) Field of Classification Search ................. 73/1.79, 73/1.81, 1.03
See application file for complete search history.

(56) References Cited

U.S. PATENT DOCUMENTS 2,862,178 A * 11/1958 Moore ......................... 324/202
2,901,829 A    9/1959 Lucas ........................... 33/567
4,738,131 A *  4/1988 Euverard ...................... 73/1.81
6,529,014 B1 * 3/2003 Nix .............................. 324/662

FOREIGN PATENT DOCUMENTS

DE    34 04 720 A1    8/1985
DE    197 02 950 A1   7/1998
FR    2 344 906 A    10/1977

* cited by examiner

*Primary Examiner*—Hezron Williams
*Assistant Examiner*—Tamiko D Bellamy
(74) *Attorney, Agent, or Firm*—Kriegsman & Kriegsman

(57) ABSTRACT

The invention relates to a calibrating device for adapting a measuring device for measuring the thickness of thin layers on an object to be measured, comprising a calibrating surface (12) having a flat upper side and a flat underside, which are provided at a distance with a predetermined thickness, characterized in that the calibrating surface (12) is arranged separate from at least one edge area (18) and the calibrating surface (12) is connected to the at least one edge area (18) via at least one transition area (14).

17 Claims, 2 Drawing Sheets

Figure 1:
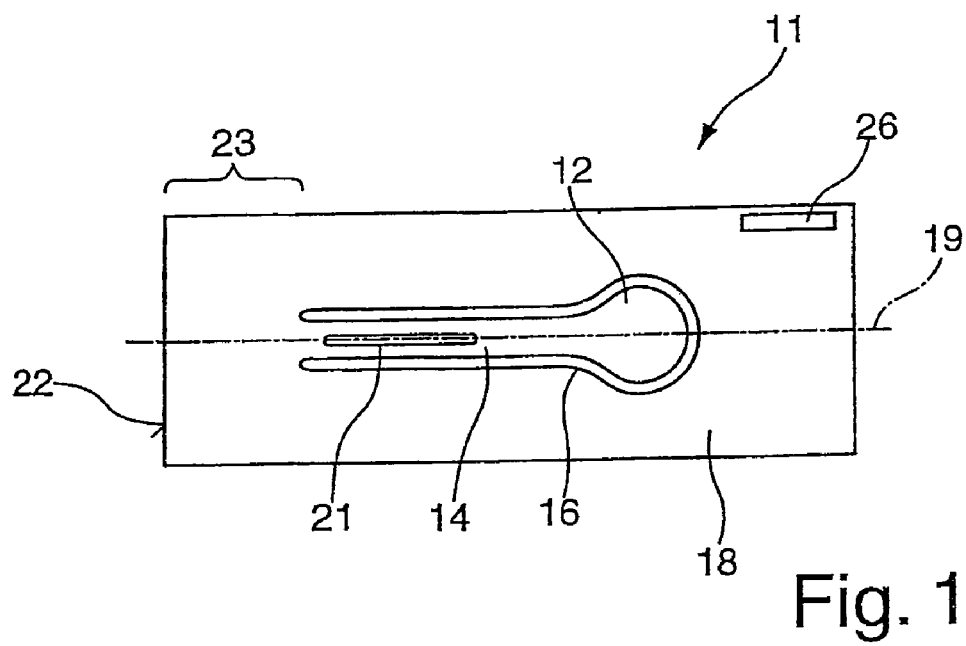

CALIBRATING DEVICE FOR ADAPTING A MEASURING DEVICE FOR MEASURING THE THICKNESS OF THIN LAYERS ON AN OBJECT TO BE MEASURED

The invention relates to a calibrating device for adapting a measuring device for measuring the thickness of thin layers on an object to be measured, comprising a calibrating surface having a flat upper side and a flat underside, which are provided at a predetermined distance from one another.

A generic manual measuring device for measuring the thickness of layers is known from a brochure by company Helmut Fischer GmbH & Co. KG Institut für Elektronik und Messtechnik. This non-destructive, fast and precise layer thickness measurement is provided for the application in the measurement of layers. The layer thickness measurement comprises a range from a few µm up to 2,000 µm, for example.

For measuring the thickness of layers, the measuring method is selected depending on the object to be measured or the basic material, respectively. The magnetic inductive method is used to measure non-magnetic layers on a ferromagnetic basic material such as, for example, zinc, chromium, copper, tin, or, respectively, color, paint, plastic, enamel on iron or steel. Electrically non-conductive layers on non-ferrous metals, such as, for example, color, paints or plastic on aluminum, brass or zinc, as well as anodized layers of aluminum will be determined by the eddy current method.

For conducting the measurement, it is provided that a measuring probe which is connected via a signal line or radio with the measuring device is to be set onto the measuring object's layer to be measured. After a short measuring period of, for example, less than one second, the measuring value will be recorded and issued by the measuring device via a display.

For the exact measurement of the layer thickness, it is necessary that the measuring device is at least standardized or calibrated on the corresponding measuring objects. A standardization is necessary as soon as the properties of the measuring object have changed only slightly. Due to the standardization, a zero point shift of a probe characteristic curve can occur which—calibrated for the corresponding probe—will be stored in the measuring device. By means of a calibration, the difference between nominal and actual values will be determined and corrected, with the actual value being the value indicated on the measuring device, and the nominal value being the value corresponding to a calibration standard. Differences in the permeability or, respectively, the electric conductivity of the basic material can be taken into account by a calibration. Here, a calibrating device will be used in the form of a film or foil to adjust the measuring device to the measuring task or, respectively, the measuring object.

If the geometry of the measuring object deviates very much from normal conditions, a master calibration can be furthermore performed. Calibrating devices are also used here; for example, four calibrating foils of a different thickness each, to perform a so-called master calibration, taking four different calibration values into account.

To perform the calibration, these calibrating foils are applied on a planar surface of the measuring object. In case of careless handling, an air gap may be formed between the calibrating foil and the surface of the measuring object which will result in the calibration becoming inaccurate. Due to the size and the planform design of the calibrating foil, the calibration of curved surfaces is time-consuming and requires certain experience.

The invention is accordingly based on the object of creating a calibrating device which enables a calibration of a measuring device for measuring the thickness of layers for measuring objects with a planar and curved surface in a simple and safe manner.

This object will be solved according to the invention by a calibrating device for adapting a measuring device for measuring the thickness of thin layers on an object to be measured, comprising a calibrating surface having a flat upper side and a flat underside, which are provided at a distance with a predetermined thickness, whereby the calibrating surface is arranged separate from at least one edge area and the calibrating surface is connected to the at least one edge area via at least one transition area. Other advantageous embodiments and developments of the invention are indicated in the other claims.

The calibrating device's embodiment according to the invention will enable the calibrating surface to be arranged quasi freely movable versus an edge area and held over at least one transition area. This will prevent the formation of an air cushion. The air can additionally escape between the edge area and the calibrating surface. At the same time, it will be enabled that the calibrating surface is at least partially swivably taken up from the plane of the edge area over a transition area, which will achieve, especially for curved objects, that after setting the measuring probe onto the calibrating surface, there will be exclusively a contact of the calibrating surface on the object in the contact point of the measuring probe to the measuring device. By means of this calibrating device according to the invention, the formation of an air gap can thus be avoided in the calibration of an object with a planar surface to be examined, and with curved surfaces of a measuring object, a defined placement can be achieved.

According to an advantageous embodiment of the invention, it is provided that the calibrating surface is at least partly surrounded by an edge area. Thus, the calibrating surface can be arranged in a protected manner, and handling will be facilitated without touching the calibrating surface.

According to an advantageous embodiment, the size of the calibrating surface of the calibrating device is designed the same or at least slightly larger than that of a contact spherical cap of a measuring probe. The calibrating surface is accordingly designed very small which, upon placement on a plane, will enable easy displacement of the air underneath and ensure fast contact. Upon calibration of a curved surface, a slight deflection of the calibrating surface from the non-burdened position will be enabled after placement of the measuring probe if this should be necessary.

Advantageously, it is provided that the calibrating surface is designed the same or at least slightly larger than the probe tip or the housing of the probe tip. This provides for easy and controlled setting down. At the same time, the position for setting down the measuring probe is designated to the user to perform the calibration.

According to another advantageous embodiment of the invention, it is provided that the calibrating surface is circular in design. This will facilitate the positioning of the measuring probes which mostly comprise a round housing. A concentric circle around the center of the movable tongue facilitates the defined setting down of the measuring probe.

According to an advantageous embodiment of the invention, it is provided that the calibrating surface, the at least one edge area, and the at least one transition area are made of a planform material, and the calibrating surface and the edge area being at least sectionally separated by a slot-shaped slit. This will enable a simple and inexpensive as well as precise manufacture of the calibrating device. Due to the use of a planform material, a one-piece calibrating device can be produced in which the calibrating surface is connected, via the transition area, to the edge area at least sectionally surrounding the calibrating surface. This also provides for simple handling.

The calibrating surface which comprises at least one edge area and at least one transition area is advantageously designed of a planform material with a constant thickness.

This has the advantage that the calibrating device is set on the measuring object independent of its alignment. Moreover, manufacture will be simplified since a planform material of a constant thickness is used which, moreover, has a particularly uniform thickness on a defined surface.

According to an advantageous embodiment of the invention, it is provided that at least one slot-shaped opening outside the calibrating surface is provided in at least one longitudinal or transverse axis of the calibrating surface. This opening will be used as an inspection window when setting the calibrating device onto a curved surface. A precise alignment can thereby be enabled and facilitated. Additionally, this opening can be used to discharge enclosed air when the calibrating device is set onto a planar surface.

According to a first alternative embodiment of the invention, it is provided that the at least one transition area is ridge-shaped in design. The calibrating surface is thereby perceived as a type of wobble plate. It is thus rendered possible that the calibrating surface is deflectable from the plane not only in the direction of a Z axis but also by means of a rotational movement about a longitudinal axis of the ridge-shaped transition area. The calibrating surface will thereby be provided great freedom of movement from the plane of the calibrating device.

The ridge-shaped transition areas advantageously comprise a slot-shaped opening. In addition to the advantageous design of an inspection window, it can also have the effect that this ridge-shaped transition area is reduced in its width and that arms are formed between the opening and the slot-shaped slit of the ridge area which will facilitate a deflection and/or twisting and flexibly take up the calibrating surface.

According to another advantageous embodiment of the invention, it is provided that the at least one transition area is ring-shaped in design. The slot-shaped slit extends about a calibrating surface; for example, along a three-quarter circle and continues outwardly in a circular form, a ring form or in a helical form. This will accordingly result in a kind of circular, ring-shaped or other closely related transition area. The calibrating surface is flexibly taken up and deflectable and swivable in a plurality of directions from the plane of the calibrating device.

It is advantageously provided that a slot-shaped opening presents a part of the slot-shaped slit. This embodiment is particularly of advantage in the ring-shaped transition area so that a limitation of the transition area or introduction of the transition area will simultaneously form one part of the inspection window.

Moreover, it can be advantageously provided that, in the edge area at least partially surrounding the calibrating surface, at least one opening is provided to achieve the facilitated displacement of the air when placing the calibrating device onto planar objects.

The slot-shaped slit for the at least sectional formation of the calibrating surface and the edge area is manufactured, according to an advantageous design of the invention, by laser cutting, water jet cutting, etching, or other chemical or mechanical removal methods. Laser cutting, water jet and etching are particularly suitable to obtain an exact and preferably burr-free edge development. Moreover, very small slit dimensions can also be achieved.

The calibrating surface and the edge area at least sectionally surrounding the calibrating surface are preferably produced in a multiple panel. Sheet-form material will be machined, for example, by means of laser cutting or water jet cutting so that a plurality of calibrating devices or, respectively, panels will be used simultaneously. These are preferably positioned via connecting ridges in a predetermined number to each other and which can be separated by simply breaking the connecting ridges.

It is advantageously provided that at least the calibrating surface is produced of a film-like material, especially of Mylar. The thickness of the films will be gradually designed, with a gradual increase preferably provided as of a thickness of 20 or 24 µm. For example, further graduation for the thicknesses of the calibration device can be provided with 40, 250, 500, 750 and 1,500 µm, etc. Mylar is electrically non-conductive.

To perform magnetic induction measuring methods, it is advantageously provided that at least the calibrating surface is made of non-magnetic metals. A foil, a strip or a sheet plate of non-magnetic metal is preferably provided. The material Cu/Be or German silver will be preferably used. Other materials which also have great hardness and low or no electrical conductivity can be used for the magnetic induction measuring method. According to another advantageous embodiment of the invention, it is provided that the at least one calibrating surface is made of an electrically non-conductive material—especially insulating material, Mylar, plastic—and will be used for the layer thickness measurement according to the eddy current method.

Additionally, magnetizable foil materials can be used, for example, to measure the ferrite concentration of austenitic steels. For this purpose, the foils are placed onto electrically non-conductive, non-magnetic basic materials. The ferrite concentration can thereby be determined at least close to the surface. The percentage share of the ferrite concentration can be determined and issued. For example, the determination of the ferrite content in weld seams of austenitic steels is a parameter for the determination of the quality of the weld seam. Also, the determination of the ferrite content in austenitic steels can be used for quality control.

Figure 2:
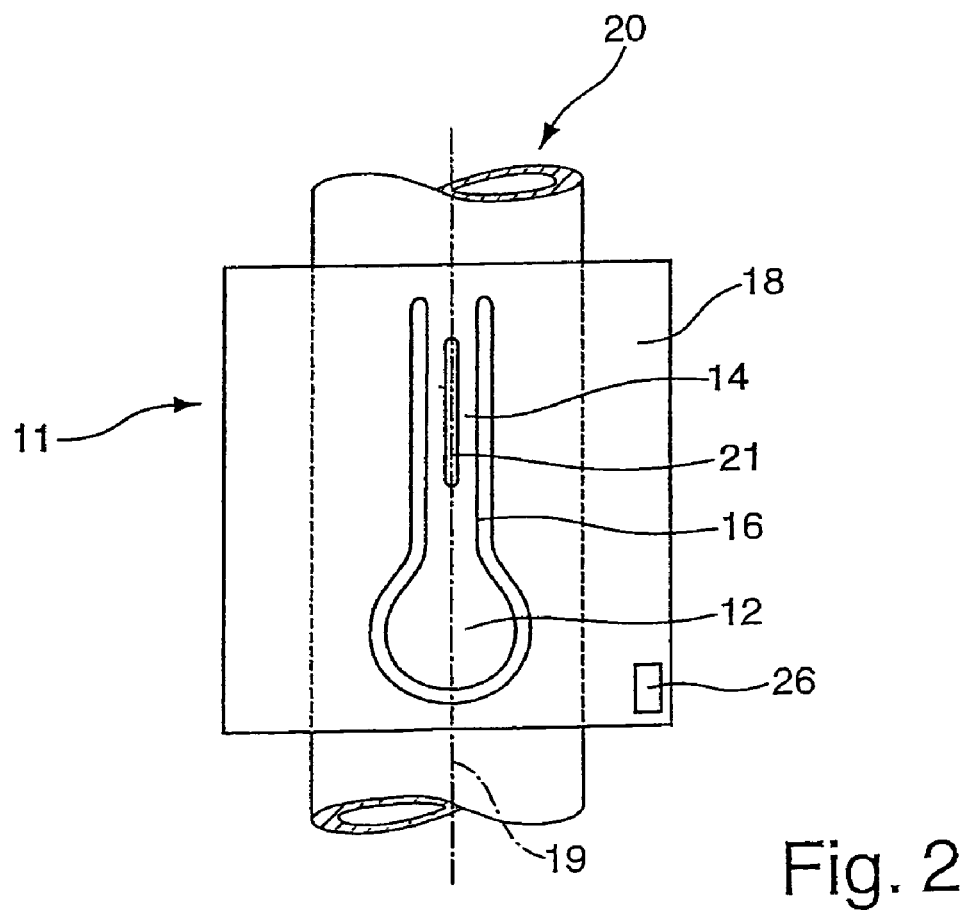
Figure 3:
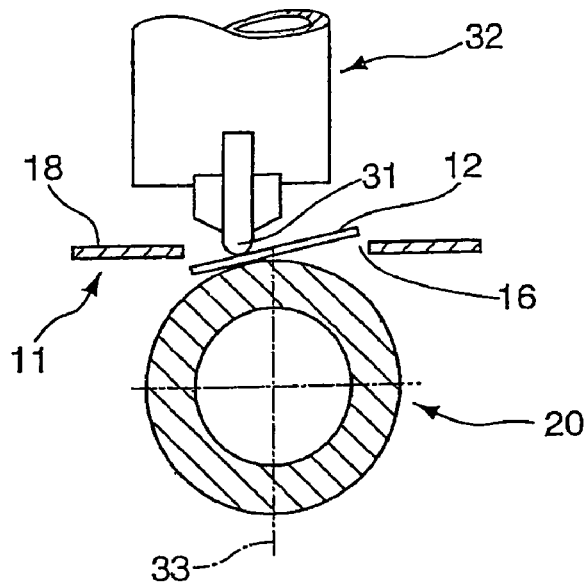
Figure 4:
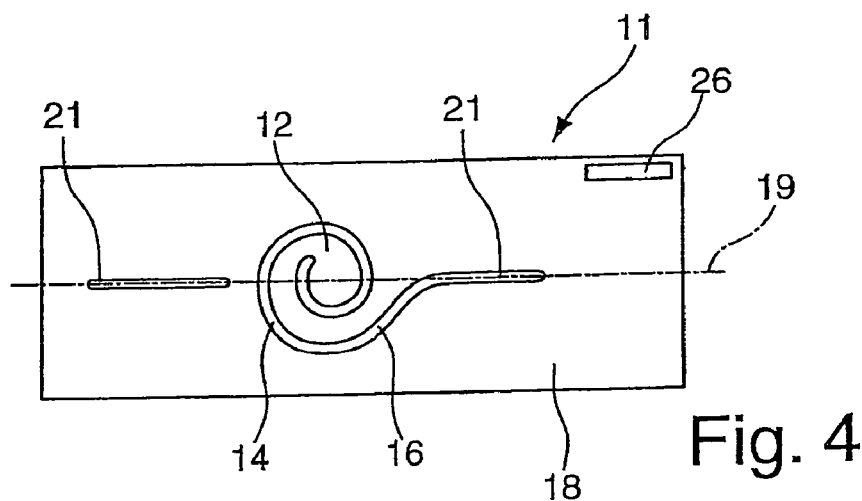
Figure 5:
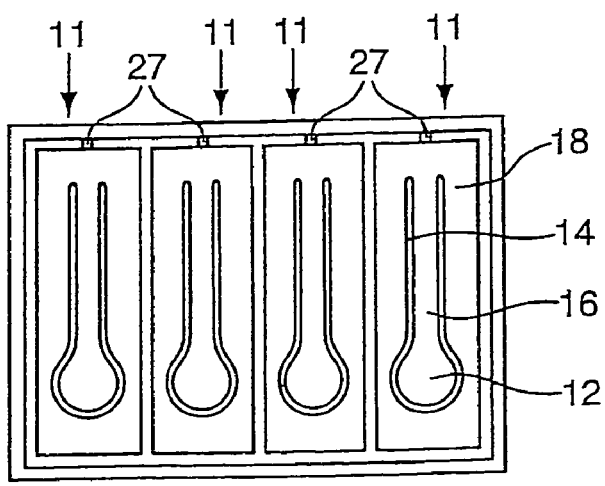

In the following, the invention as well as additional advantageous embodiments and developments of the same will be explained and described in detail on the basis of the examples presented in the drawings. The features which can be gathered from the description and the drawings can be used individually by themselves or in a plurality in any combination according to the invention. In the Figures:

FIG. 1 shows a diagrammatic top view of a calibrating device according to the invention;

FIG. 2 a diagrammatic top view of a calibrating device on an object with a curved surface;

FIG. 3 a diagrammatic sectional view of a calibrating device during a measurement on an object with a curved surface;

FIG. 4 a diagrammatic top view of an alternative embodiment of a calibrating device according to the invention; and FIG. 5 a diagrammatic top view of a multiple panel of the calibrating device according to the invention, in accordance with FIG. 1.

FIG. 1 shows a top view of a calibrating device 11 according to the invention. This calibrating device 11 is a planar form whose thickness is equivalent to a layer thickness to be measured to which is to be calibrated a measuring device—not shown in detail—with a measuring probe. First, the uncoated basic material will be measured to perform the standardization. Subsequently, the calibrating device 11 is applied on the uncoated measuring object to perform the calibration. Here, a plurality of measurements are preferably performed with new positions on the object to be measured to obtain an analysis and an average value. After performing the calibration, the corrected probe characteristic curve—deviating from a theoretically stored probe characteristic curve—will be stored in the measuring device—said corrected characteristic curve being strictly valid for the specific object to be measured. The same factors apply when the calibration of a measuring device is reviewed at time intervals.

The calibrating device 11 is designed as a planar form and comprises a calibrating surface 12 which goes over into a transition area 14. The calibrating surface 12 and the transition area 14 are surrounded by a slot-shaped slit 16 whereby the calibrating surface 12 and the transition area 14 are separated from the edge area 18. The calibrating surface 12 is thus connected to the edge area 18 via the transition area 14. The geometry of the calibrating surface 12 is designed, by way of example, as a circular surface, more or less in the form of a fan. Other geometries can also be provided, such as, for example, oval, angular, or a combination of angular and circular geometries.

According to the exemplary embodiment, the transition area 14 is designed in ridge shape and designed long as compared to the measuring surface 16. A type of tongue-like arrangement will be created thereby which has the advantage that—due to the relatively long and thin transition area 14—the calibrating surface 12 is easily rotatably arranged, from the plane towards the top and the bottom, as well as about a longitudinal axis 19.

In the ridge shaped transition area 14, an opening 21 is moreover provided which preferably lies in the longitudinal axis 19. This opening 21 supports the flexible and easy deflection of the calibrating surface 12. At the same time, this opening 21 is used to enable a targeted and secure positioning of the calibrating device 11 on curved or round objects 20, such as, for example, bolts, pipes or the like. This is shown in FIG. 2 by way of example. The longitudinal axis 19 is equivalent to a longitudinal axis of the curved object 20. A simple geometric alignment can be achieved thereby.

In the exemplary embodiment, the edge area 18 completely surrounds the calibrating surface 12 and the transition area 14. Alternatively, it can also be provided that the edge area 18 is exclusively designed as a base and will extend from an edge 22 up to the transition area 14. A type of handle area 23 is thus provided which is reduced to a minimum.

The edge area 18 shown in FIG. 1 is provided, alongside a lateral edge, with a marking 26 which at least comprises the thickness of the calibrating device 11.

The transition area 14 between the edge area 18 and the measuring surface 16 goes over with a constant cross section into the calibrating surface 12. It can be alternatively provided that the transition of the transition area 14 to the calibrating surface 12 is reduced in cross section or comprises a type of neck-shaped transition. Alternatively, the entire area 18 can also be reinforced in the case of thin foils or films or doubled up for easier handling.

FIG. 3 shows a diagrammatic cross-section of a calibrating device 11 during a measurement on a round object 20. A contact spherical cap 31 of a measuring probe 32 is set on—outside an axis of symmetry of the calibrating surface 12. Due to the design of the transition area 14, it is rendered possible that the calibrating surface 12 can be moved out of the plane of the calibrating device 11 or, respectively, is easily turnable so that an exact calibration can be performed. For the calibration, it is not required that the contact spherical cap 31—comprising a spherical contact surface—will be set on centrally to a longitudinal center plane 33 of the object 20. Calibration will also be possible in case of a lateral offset, as shown in FIG. 3. This will enable a calibration which merely requires that the measuring probe 32 will be positioned with its contact spherical cap 31 onto the calibrating surface 12, while it is not required that the measuring probe will be positioned on an exact point of the calibrating surface 12. Fast calibration can thereby be provided.

FIG. 4 shows an alternative embodiment of the calibrating device 11 according to the invention. With this embodiment, the slot-shaped slit 16 extends in helical form or spiral form from the inside to the outside. The slot-shaped slit 16 can also comprise a plurality of windings. This exemplary embodiment accordingly comprises a circular segment shaped transition area 14. The slot-shaped slit 16 comprises two openings 21. The first opening 21 forms an extension of the slit 16, and the other opening 21 is additionally provided separately from the calibrating surface 12 and the transition area 14. Such separate arrangement can also be provided in FIG. 1.

FIG. 5 shows a top view of a multiple panel. The calibrating devices 11 can be manufactured, for example, of a strip-like material into which the at least one slot-shaped slit 16 and the at least one opening 21 are provided by means of laser cutting, water jet cutting, etching or the like. Due to a continuous production and the use of a strip of material, economic manufacture of a plurality of calibrating devices 11 with a constant thickness can be simultaneously provided. The number of panels of calibrating devices 11 in one unit can be optionally determined. The calibrating devices 11 are held, via connecting ridges 27, to a frame or a strip of material. They can thus be transported without any damage and can be used, as needed, by breaking the connecting ridges 27.

These calibrating devices 11 according to the invention—whose features are, each separately, essential for the invention and can be randomly combined with each other—will rest accurately on a curved as well as a planar surface and will enable a calibration of the measuring device.

The invention claimed is:

1. Calibrating device for adapting a measuring device for measuring the thickness of thin layers on an object to be measured, comprising a calibrating surface having a flat upper side and a flat underside, which are provided at a distance with a predetermined thickness, characterized in that the calibrating surface is arranged separate from at least one edge area by a slot-shaped slit and the calibrating surface is connected to the at least one edge area via at least one transition area and the calibrating surface, the at least one edge area and the at least one transition area are made of a planform material.

2. Calibrating device according to claim 1, characterized in that an edge area is provided which at least partially surrounds the calibrating surface.

3. Calibrating device according to claim 1, characterized in that the size of the calibrating surface is the same as or at least slightly larger than a contact spherical cap of a measuring probe of the measuring device.

4. Calibrating device according to claim 1, characterized in that the calibrating surface is circular in design.

5. Calibrating device according to claim 1, characterized in that the calibrating surface, the at least one edge area and the at least one transition area are of a constant thickness.

6. Calibrating device according to claim 1, characterized in that a slot-shaped opening is provided outside of the calibrating surface in one longitudinal axis of the calibrating surface.

7. Calibrating device according to claim 1, characterized in that the at least one transition area is ridge-shaped in design.

8. Calibrating device according to claim 7, characterized in that at least one slot-shaped opening is provided in the ridge-shaped area.

9. Calibrating device according to claim 1, characterized in that the transition area is circular, ring-shaped or spiral-shaped in design.

10. Calibrating device according to claim 6, characterized in that the slot-shaped opening is a part of the slot-shaped slit.

11. Calibrating device according to claim 1, characterized in that at least one opening is provided in the edge area.

12. Calibrating device according to claim 1, characterized in that the at least sectionally designed slot-shaped slit between the calibrating surface and the edge area is manufactured by laser cutting, water jet cutting, etching, by a mechanical or chemical removal method.

13. Calibrating device according to claim 1, characterized in that a plurality of panels are manufactured in a planar form which are positioned to each other by connecting ridges or held positioned to each other.

14. Calibrating device according to claim 1, characterized in that the calibrating surface is manufactured of a foil-like material or a planar form.

15. Calibrating device according to claim 1, characterized in that at least one calibrating surface is manufactured of a non-magnetizable material, especially Mylar, plastic or insulating material.

16. Calibrating device according to claim 1, characterized in that at least one calibrating surface is manufactured of a magnetizable material, especially for the determination of a ferrite content.

17. Calibrating device according to claim 1, characterized in that the calibrating surface is arranged quasi freely movable versus an edge area.

* * * * *